US008383051B2

(12) United States Patent
Gbordzoe et al.

(10) Patent No.: US 8,383,051 B2
(45) Date of Patent: Feb. 26, 2013

(54) SEPARATING AND STRIPPING APPARATUS FOR EXTERNAL FCC RISERS

(75) Inventors: Eusebius Anku Gbordzoe, Houston, TX (US); Chris Robert Santner, Houston, TX (US)

(73) Assignee: Stone & Webster Process Technology, Inc., Houston, TX (US)

( * ) Notice: Subject to any disclaimer, the term of this patent is extended or adjusted under 35 U.S.C. 154(b) by 752 days.

(21) Appl. No.: 12/507,404

(22) Filed: Jul. 22, 2009

(65) Prior Publication Data

US 2011/0017639 A1 Jan. 27, 2011

(51) Int. Cl.
*B01J 8/24* (2006.01)
*C10G 47/30* (2006.01)

(52) U.S. Cl. ........ 422/144; 422/145; 422/147; 208/113; 208/150; 208/151; 208/161

(58) Field of Classification Search .................. 422/144, 422/145, 147; 208/113, 150, 151, 161
See application file for complete search history.

(56) References Cited

U.S. PATENT DOCUMENTS

| | | | | |
|---|---|---|---|---|
| 2,472,777 A * | 6/1949 | Putney | ............................ | 55/397 |
| 3,952,022 A * | 4/1976 | Becuwe | ........................ | 549/250 |
| 4,288,235 A | 9/1981 | Gartside et al. | | |
| 4,348,364 A | 9/1982 | Gartside et al. | | |
| 4,404,095 A | 9/1983 | Haddad et al. | | |
| 4,433,984 A | 2/1984 | Gartside et al. | | |
| 4,591,427 A * | 5/1986 | Krug et al. | .................... | 208/161 |
| 4,756,886 A | 7/1988 | Pfeiffer et al. | | |
| 4,891,129 A | 1/1990 | Barnes | | |
| 4,946,656 A * | 8/1990 | Ross et al. | .................... | 422/144 |
| 5,043,058 A | 8/1991 | Forgac et al. | | |
| 5,055,177 A | 10/1991 | Haddad et al. | | |
| 5,089,235 A | 2/1992 | Schwartz et al. | | |
| 5,110,323 A | 5/1992 | Soni | | |
| 5,259,855 A | 11/1993 | Ross, Jr. et al. | | |
| 5,837,129 A | 11/1998 | Ross, Jr. et al. | | |
| 6,296,812 B1 | 10/2001 | Gauthier et al. | | |
| 6,692,552 B2 | 2/2004 | Benham | | |

OTHER PUBLICATIONS

International Search Report with the Written Opinion of the International Searching Authority, for corresponding application No. PCT/US2010/042272, mailed on Sep. 1, 2010.

* cited by examiner

*Primary Examiner* — Jennifer A Leung

(74) *Attorney, Agent, or Firm* — Locke Lord LLP; Alan B. Clement; Peter J. Fallon

(57) ABSTRACT

The present invention provides a compact riser separation system for Fluid Catalytic Cracking reactors possessing an external riser system wherein the riser enters the reactor from outside the reactor vessel.

10 Claims, 4 Drawing Sheets

SEPARATING AND STRIPPING APPARATUS FOR EXTERNAL FCC RISERS

FIELD OF THE INVENTION

The invention relates to a separating and stripping apparatus and its use in a process for catalytic cracking of hydrocarbons. More particularly, the present invention relates to rapid separation and effective stripping of catalytically cracked hydrocarbon streams in a disengaging apparatus having a compact riser separation system, wherein an external riser that enters the disengaging apparatus from the outside.

BACKGROUND OF THE INVENTION

Fluid Catalytic Cracking (FCC) is a commonly-used process in oil refineries that produces high yields of gasoline and liquefied petroleum gas, which are in a high demand in the United States, and throughout the world. Despite the long existence of the fluidized catalytic cracking process, techniques are continually sought for improving product recovery both in terms of product quantity and composition, i.e., yield and selectivity.

In general, commercial fluid catalytic cracking processes are carried out in FCC units in which the riser reactor is either internal to, or external to, a larger vessel, typically known as a disengaging vessel or reactor vessel. As known within the art, FCC units with either internal or external risers, present their own different advantages and disadvantages as related to, among other things, size and efficiencies.

Typically, in FCC processes, catalyst is brought into contact with a hydrocarbon feed in a reaction zone, which is generally in the form of an elongated tube called the riser, riser reactor or riser reactor pipe (although sometimes the reactor can be a downflow reactor). The riser can be located inside (i.e., an internal riser), or outside (i.e., an external riser) of the disengager vessel. The catalyst is then substantially separated from the hydrocarbons in one or more separation stages and the cracked hydrocarbons, accompanied by as small a quantity as possible of catalyst, leave the reaction zone for product recovery in downstream fractionation unit and further processing operations. The separated spent catalyst from the separators is collected in the bottom of the disengager (in a dense bed) where it typically is brought into contact with a gas which is different from the hydrocarbons, such as, for example, ammonia, nitrogen, or steam, to encourage removal and recovery of volatile hydrocarbons entrained with the catalyst, commonly referred to as stripping (or steam stripping where steam is used as the stripping medium). The catalyst is then evacuated to a regeneration zone where the coke formed during the reaction in the riser reactor and hydrocarbons which have not yet been desorbed during the stripping stage are burned in an oxidizing medium.

However, in order to obtain selective products and avoid over cracking the desired hydrocarbon to less desirable by-products in the reaction zone of the catalytic cracking unit, it is preferable to rapidly separate the gaseous products produced in the contact zone from the spent catalyst, including by way of a first (rough cut) separation, which although does not provide for complete separation of the spent catalyst particles from the cracked products, sufficiently removes a substantial proportion of them in a quick fashion to reduce degradation reactions.

A number of ways exist for carrying out these operations of separation/desorption and the literature is replete with devices developed for catalytic cracking processes, which are more or less effective for such different operations. And while it is relatively simple to carry out rapid separation or effective stripping, it is difficult to carry out rapid separation and effective stripping substantially simultaneously. Further, as the price of oil is ever increasing and the amount of oil available for conversion into petrochemical products becomes rarer, there is always a need in the art for more efficient rough cut catalyst separation processes in order to obtain higher yields of desirable products.

For example, U.S. Pat. Nos. 4,288,235, 4,348,364 and 4,433,984 disclose side-by-side type apparatus for rapidly separating particulate solids from a mixed phase solids-gas stream from tubular type reactors. The apparatus projects solids by centrifugal force against a bed of solids as the gas phase makes a 180° directional change to effect separation. The solids phase undergoes two 90° changes before exiting the apparatus.

Other rapid separation and stripping apparatus include U.S. Pat. No. 5,837,129, which discloses an FCC unit having an internal riser, and a ramshorn inertial type of separator at the terminal end of a riser reactor in combination with a horizontally disposed gas outlet. The horizontally disposed gas outlet facing upwardly and toward the riser reactor, or upwardly and away from the riser reactor, provide quick and efficient separation of hydrocarbon vapor product from catalyst particles.

In general, rapid separation can be effected using cyclones directly connected to an internal riser, as described in U.S. Pat. No. 5,055,177. In this system, cyclones connected to the riser are inside a disengaging vessel, which generally also encloses a second cyclone stage. The gas separated in the first stage enters the second cyclone stage for more complete separation. The catalyst is directed into the dense phase fluidized stripping bed of the disengaging vessel where steam is injected as a counter-current to the catalyst to desorb the hydrocarbons. Such hydrocarbons are then evacuated from the reactor into the upper dilute phase of the disengaging vessel and introduced into the separation system into the second cyclone stage. The fact that there are two cyclone stages, one connected to the riser carrying out primary separation, the second generally being connected to the outlet for gas from the first stage cyclones, necessitates a very large diameter for the disengaging vessel surrounding the two cyclone stages. The dilute phase of that vessel is only traveled by the gases desorbed in the stripper, or by the gases entrained by the catalyst in the solid outlets (diplegs) of the first stage. The gases from the stripping section are thus systematically exposed to a long term thermal degradation in the stripper, because if the primary cyclone functions correctly, a fairly small quantity of hydrocarbons is entrained in the dipleg of the primary cyclone towards the stripper. The volume of the disengaging vessel being large and the quantity of hydrocarbons and stripping steam being fairly small, the surface velocity of the gases in the diluted phase of the disengager vessel outside the primary cyclones is very low typically not greater than 2 feet per second (ft/s). Consequently, the evacuation time for hydrocarbons stripped or entrained in the diplegs with the catalyst will necessarily be of the order of several minutes.

A further disadvantage of that separation system is that it introduces hydrocarbons entrained or adsorbed onto the catalyst in localized fashion into the fluidized stripping bed. Because the fluidized bed is a poor radial mixer but a very good axial mixer, there is an inevitable loss of efficiency in the stripping zone. It would be possible to improve stripping by introducing stripping gases directly into the solid outlet. Nevertheless, this would only be effective if the catalyst flowed slowly in the cyclone outlet in order not to entrain gases, which is not possible to achieve if proper operation of the primary cyclones is to be retained.

U.S. Pat. No. 6,296,812 provides an apparatus for separating and stripping a mixture of gas and a stream of particles in an upflow and/or downflow internal riser reactor. The apparatus has a reaction envelope containing a vessel for separating the particles from the mixture and a vessel for stripping the separated particles located below the separation vessel, which has a plurality of separation chambers and a plurality of stripping chambers distributed axially about one extremity of a internal riser reactor of elongate form. The upper portion of each separation chamber includes an inlet opening communicating with the reactor, so as to separate the particles from the gaseous mixture in a substantially vertical plane, with each separation chamber containing two substantially vertical lateral walls that are also the walls of the circulation chamber.

The present applicants have inventively developed a highly compact riser separation system having an external riser utilizing the concept described in U.S. Pat. No. 6,296,812, which enables proficient separation efficiency, simultaneous effective stripping and rapid evacuation of the separated hydrocarbons due to the improved compactness of the equipment while retaining all the advantages associated with the separation system in U.S. Pat. No. 6,296,812.

SUMMARY OF THE INVENTION

The present invention is directed to an apparatus (10) for separating and stripping a gaseous mixture and a stream of particles which comprises a reactor vessel shell (51) having a means for receiving a mixture of cracked gases and spent catalytic solid particles via a riser cross-over conduit (46) from a riser reactor pipe (41) (i.e., external riser reactor), located external to said reactor vessel shell (51), and comprising an upper dilute portion and a lower stripping bed portion, and at least one separating chamber (50) for receiving said mixture of cracked gases and spent catalytic solid particles from said cross-over conduit (46) for separating spent catalytic particulates from the cracked gases located within said reactor vessel shell (51) and comprising a dipleg (37) for discharging separated catalytic particles into the lower stripping bed portion. A stripping chamber (49) comprising at least one inlet opening (48) communicating with said separating chamber (50) for receiving separated cracked gases from the separating chamber (50). A stripper vapor inlet opening (45) for receiving stripping gas from the stripping bed portion and a stripper conduit (39) for evacuating vapors from said stripping chamber (49), and at least one cyclone separator (43) for receiving vapors from said stripping chamber (49) and comprising at least one cyclone separator dipleg (52) having an outlet (38) for returning separated solids to the stripping bed and a vapor evacuation conduit (42) for discharging vapors to a gas outlet collector (40) which communicates with a vapor outlet conduit (44) for removing separated vapors from said reactor vessel shell (51).

The stripping chamber (49) is positioned centrally within the reactor shell (51) and the separating chamber (50) is positioned axially about the stripping chamber (49) and wherein the stripping chamber (49) ascends centrally through the separating chamber (50) from a position below to a position above the separating chamber (50).

The inlet opening (48) comprises at least one gas flow direction change means (48*a*) defined in part by one outer wall of the stripping chamber (49) located above the inlet opening (48). The gas flow direction change means (48*a*) receives separated cracked gases traveling vertically upward after separation from spent catalyst particles in the separating chamber (50). More particularly, the mixture of cracked gases and spent catalyst particulates travels through the riser cross-over conduit (46) and enters the separating chamber (50) where it impacts partitioning baffle (47) located opposite the entrance of the riser cross-over conduit (46) which separates the horizontally traveling mixture of cracked gases and spent catalyst into two streams traveling around the circumference of the separating chamber (50). A baffle (47*a*) positioned opposite the partition baffle (47) and above the flow direction means (48*a*) in the separating chamber (50), prevents the two catalyst laden vapor mixtures from colliding and causing a catalyst cloud, which would reduce catalyst collection efficiency. The catalyst then travel downwardly through the separating chamber (50) and enters diplegs (37). The separated vapors conversely travel upwardly through the opening (48) and enter the stripping chamber (49).

The catalyst exits the diplegs (37) and enters into a fluidized stripper bed located below the dipleg (37). In the stripper bed, the spent catalyst are contacted with a stripping medium, preferably steam, although other stripping gases known to those skilled in the art may be employed, to remove volatile hydrocarbons entrained by the catalyst. The stripper gases exit the bed portion and travel upwardly into the stripper chamber (49) stripper through vapor opening (45). Thus, the stripper vapors and stripped hydrocarbon vapors (along with dome steam, i.e., steam) mix with the cracked product gases in stripping chamber. The stripping chamber is close coupled to at least one cyclone separator (43) for separating entrained particulates from gaseous effluents by means of a stripper conduit (39). The separated gases exit the cyclone separators (43) through an evacuation conduit (42) and the separated spent catalyst particulates flows down the cyclone separator dipleg (52) and exits the cyclone separators dipleg through outlet (38) for return to the stripping bed (and eventually regeneration in a regenerator, such as is known to those skilled in the art). The gases exit the reactor shell (51) via an outlet conduit (44) in communication with a gas outlet collector (40) which communicates with the evacuation conduits (42) for downstream processing into component products, as is known to those skilled in the art.

The presently claimed apparatus (10) may be, for example, an apparatus for the fluidized catalytic cracking of hydrocarbons. The apparatus (10) is advantageously provided with an external riser reactor (41) that has an ability to enter the apparatus (10) from outside of the apparatus (10). Furthermore, the presently claimed riser separation system may be advantageously adapted to fluid catalytic cracking systems having an external riser reactor.

DETAILED DESCRIPTION OF THE DRAWINGS

The invention will be better understood from the accompanying figures which schematically illustrate the apparatus and in which.

DETAILED DESCRIPTION OF THE INVENTION

Figure 1:
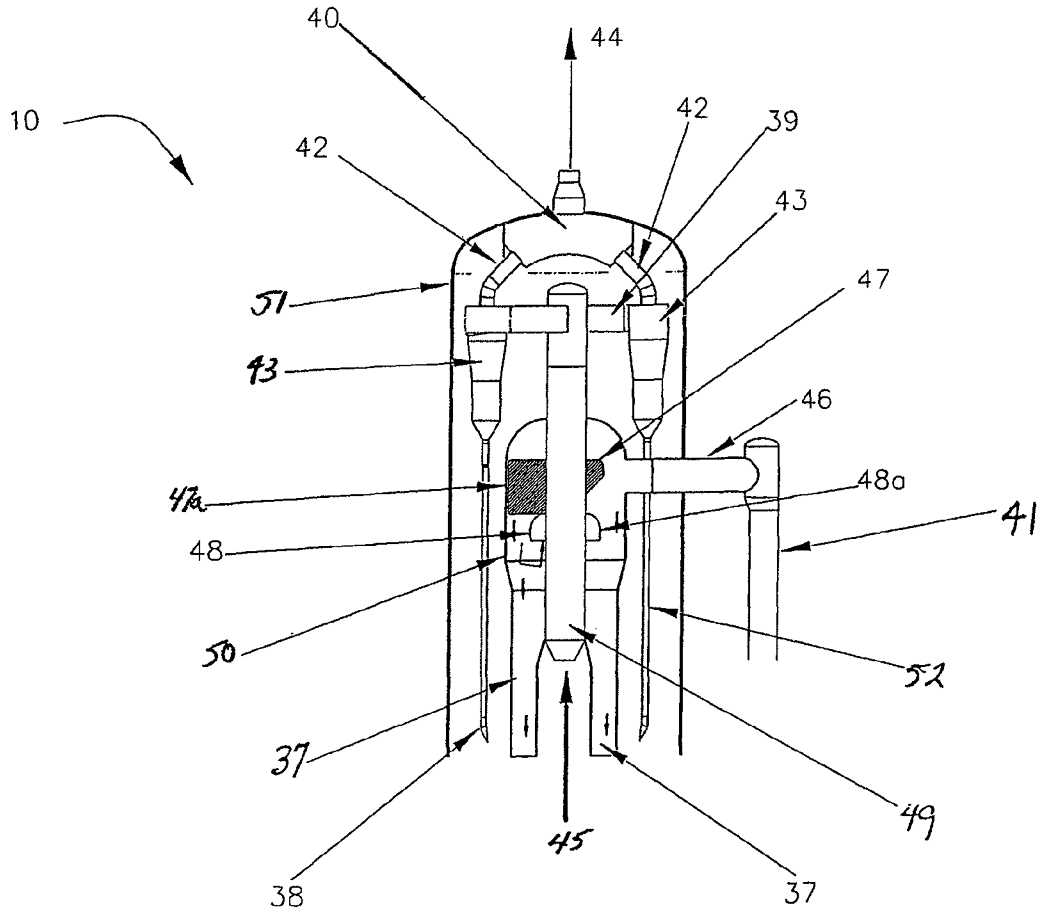
FIG. 1 illustrates a perspective view of the apparatus of the present invention for the fluidized bed catalytic cracking of hydrocarbons, which includes an external riser reactor that enters the apparatus from the outside.

The present invention broadly is directed to an apparatus (10) for separating hydrocarbons and/or other gases from solid particles, such as a particulate catalyst and/or other particles (including inert particulates), which are typically finely divided and porous, in a mixture containing the gases and solid particles, for example, an apparatus for the fluidized catalytic cracking (FCC) of hydrocarbons. This mixture may be an effluent that exits an outlet of a different reactor, for example, one that brings an essentially gaseous phase into contact with a solid phase. The apparatus generally includes a compartmentalized arrangement of one or more reactors, chambers, conduits, inlets, outlets, baffles and diplegs, and an external riser reactor pipe, with communication between many of these components, and according to one preferred embodiment of the invention, can beneficially produce a hydrocarbon gas that contains less than about 0.05 percent of solids by weight, and in another preferred embodiment of the invention, preferably can produce a hydrocarbon gas that contains less than about 0.02 percent of solids by weight.

The various components or parts of the apparatus of the invention may be generally arranged in the manner that is shown in the drawings, or is described herein, or otherwise. The present invention is not limited to the precise arrangements, configurations, dimensions, instrumentalities, components, angles, reactant or product flow directions or conditions that are shown in these drawings, or described hereinbelow. These arrangements, configurations, dimensions, instrumentalities, components, angles, reactant or product flow directions and/or conditions may be otherwise, as circumstances require or are desired. For example, fewer or additional separating chambers, stripping chambers, cyclones, baffles, diplegs, conduits, inlets and/or outlets for gases, liquids, solids or mixtures thereof, and/or other components or parts, may be employed. Further, these components and parts may be arranged in a wide variety of different manners, and may have a wide variety of different sizes. The location of the various components or parts of the apparatus, and the means employed for attaching one or more components, parts and/or areas of the apparatus to one or more other components, parts and/or areas of the apparatus, may also be varied. Moreover, rather than attaching various components, parts and/or areas of the apparatus together, one or more components, parts and/or areas of the apparatus may be machined or otherwise formed from one piece of metal or other material. Still further, various components, parts and/or areas of the apparatus may be either permanently, or removably, attached with other components, parts and/or areas of the apparatus, and may be movable or not movable. Removably attached components and parts are often preferable because such components and parts may generally be replaced and/or cleaned in a simpler and more cost effective manner in the event that they become dirty, worn, damaged or destroyed.

Figure 2:
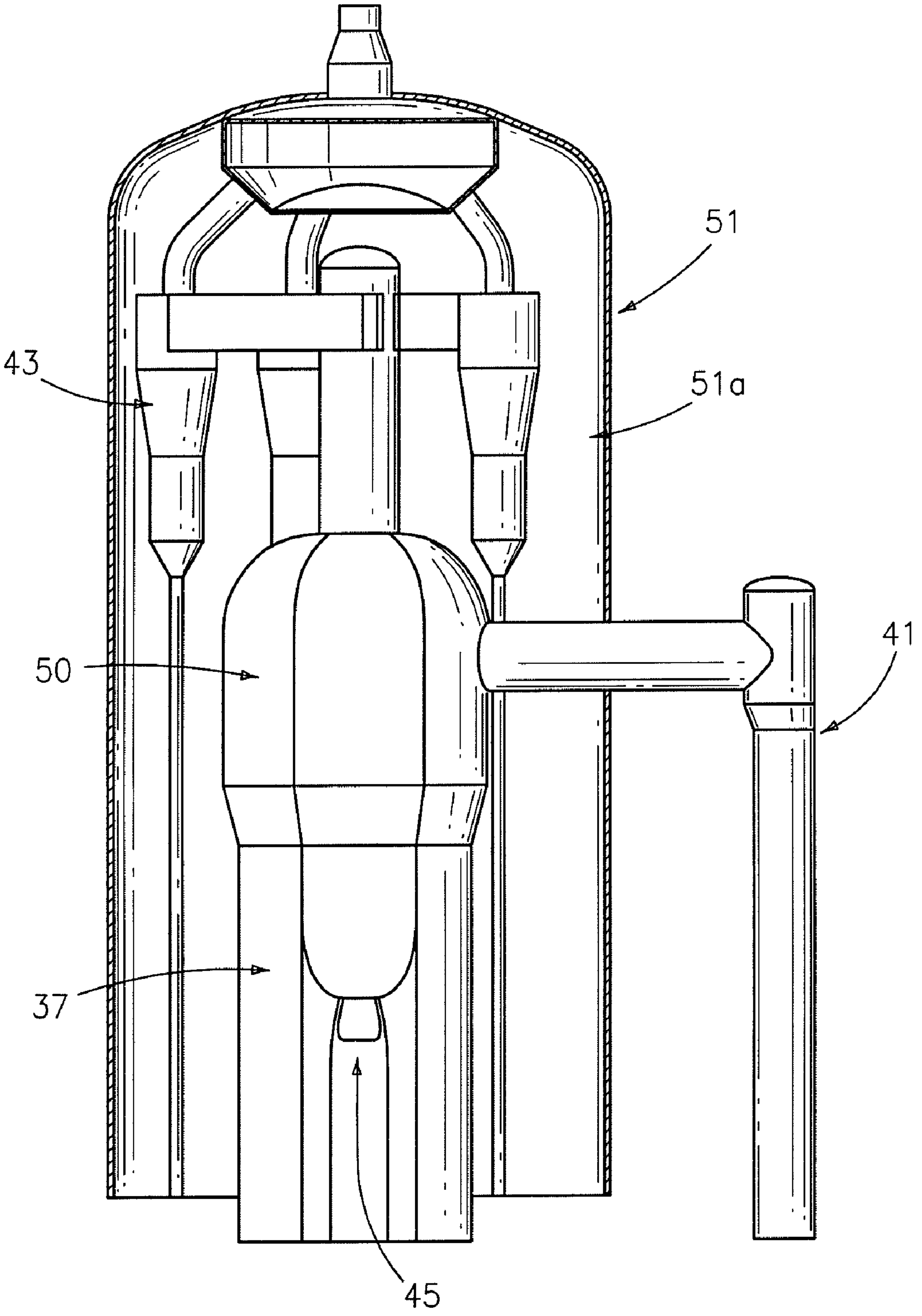
FIG. 2 is a three-dimensional illustration of the apparatus that is presented in FIG. 1.

Referring now to FIGS. 1 and 2, the apparatus (10) of the present invention is typically employed in a fluidized catalytic cracking (FCC) unit, which preferably comprises a cylindrical reactor shell (51) form, and at least one external riser reactor (41) (i.e., external riser). The reactor shell (51) includes an upper dilute area (51*a*) and a lower dense bed stripping area (not shown). The upper dilute area (51*a*) of the reactor vessel contains a vessel vapor outlet conduit (44), gas outlet collector (40), a cyclone evacuation conduit (42), a separating chamber (50), a stripping chamber (49) with an inlet opening (48) and flow direction change means (48*a*), secondary separator (43), partition baffle (47), baffle (47*a*) and dipleg (52).

The lower dense bed stripping area contains a stripping bed (which may optionally include packing or baffles as is known to those skilled in the art), means for supplying stripping gas to the stripping bed (such as a steam ring) and a stripped catalyst outlet for removing stripped catalyst from the reactor shell (51) and transferring the stripped catalyst to a regenerator. Conventional regenerator configurations, as know in the art, may be employed and all such obvious modifications are within the full-intended scope of the appended claims. The apparatus (10), and its various components, preferably also include for vapors, liquids, solids and mixtures thereof one or more conduits, one or more inlet openings and one or more outlet openings. Optionally, the apparatus (10) may additionally include one or more circulation chambers (preferably distributed about the apparatus), riser cross-over ducts (or other ducts), envelopes, valves, nozzles, and deflector cones.

Additionally, the apparatus (10), may optionally include, nozzles, e.g., for quenching (not shown), residual cracking reactions, and/or column(s) for fractionating at least one different hydrocarbon cut that is present in the gases that exit the secondary separator. Quenching is more fully described in the published art, for example, in Forgac et al., U.S. Pat. No. 5,043,058. Other optional features of the apparatus (10), may be, cyclone separator that may or may not be close coupled to the riser terminator (not shown). Other types of gross cut separators may be employed in addition to the cyclones, such as a ramshorn separator, an inverted can separator, or a globe separator. See, for example, the separators shown in Pfeiffer et al., U.S. Pat. No. 4,756,886, Haddad et al., U.S. Pat. No. 4,404,095; Ross et al., U.S. Pat. No. 5,259,855, Barnes, U.S. Pat. No. 4,891,129 and/or Gartside et al., U.S. Pat. No. 4,433,984.

As is shown in FIGS. 1 and 2, the external riser reactor pipe (41) preferably has an elongate form that is substantially vertical, the bottom of which is equipped for receiving hot regenerated catalyst from a regenerator (or other particulates), nozzles for feeding an atomized hydrocarbon feedstock to the riser (or other means for introducing a feedstock to the riser reactor) and optionally a lift gas. The top of the riser (41) connects to a riser cross-over conduit (46), where a mixture of cracked gases and solid particles that have traveled in an upward direction in the riser reactor pipe (41), and have undergone a fluidized catalytic cracking (or other) reaction, can flow out of the riser reactor pipe (41) into the riser cross-over duct to and into the separating chamber (50) that is in a communication with the riser reactor pipe riser cross-over conduit (46).

According to one embodiment of the invention, the diameter of the external riser reactor pipe (41) ranges from about 2 inches to about 6 feet and larger, and in another embodiment ranges from about 3 feet to about 6 feet. According to another embodiment of the invention, the diameter of riser cross-over conduit (46) for the cracked gases and solid particles ranges from about few inches to about 6 ft or larger, and in still another embodiment of the invention ranges from about 3 ft to about 6 ft.

After the mixture of gases and solid particles undergoes a reaction in the external riser reaction pipe (41), such as fluidized catalytic cracking, the resulting reaction mixture of cracked hydrocarbon (or other) product gases and solid spent catalyst (or other) particles preferably travels out of the outlet external riser (41) which connects to the riser cross-over conduit (46) that extends from the riser and through the reactor shell wall (51), and forms a part of, an upper portion or end of a separating chamber (50) in a substantially horizontal manner, as is shown in FIGS. 1 and 2.

Typically, for an FCC unit, the residence time in the external riser reactor pipe (41) and temperature and pressure, are effective for permitting it to successfully undergo a fluidized catalytic cracking (or other) reaction. According to one embodiment of the invention, such as an FCC cracking of a vacuum gas oil (other hydrocarbonaceous feedstocks are of course contemplated for use in the present invention, such as but not limited to naphtha, atmospheric gas oils, cycle oils and resids, as are well known to those of skill in the art) the period of residence time in the riser reactor pipe (41) ranges from about 0.5 to about 4 seconds, and in another embodiment of the invention, ranges from about 1 to about 3 seconds.

According to an embodiment of the invention, the riser outlet temperature may range from about 900° F. to about 1090° F. and higher, and in another embodiment of the invention ranges from about 950° F. to about 1050° F. In an embodiment of the invention, the pressure in the external riser reactor pipe (41) ranges from about few psig (pound-force per square inch gauge) to about 30 psig and higher, and in another embodiment ranges from about 10 psig to about 30 psig. According to yet another embodiment of the invention, the feed travels through the external riser reactor pipe at a velocity generally ranging from about 30 to about 75 ft/s and higher, and in still yet another embodiment ranges from about 55 to about 65 ft/s.

The separator of the present invention includes at least one elongated and substantially vertical separating chamber (50) that extends centrally in the disengaging vessel (51), as is shown in FIGS. 1 and 2. The separating chamber (50) is in fluid communication with the substantially horizontal riser cross-over conduit (46) which passes from the top of the riser reactor through the reactor shell (51) into the interior of the disengaging vessel (51). In this configuration, a mixture of gases and solids (cracked hydrocarbons and spent catalyst) that has undergone a reaction in the external riser reactor pipe (41) can flow into the riser cross-over conduit (46) and into the separating chamber (50) via the riser cross-over conduit (46). The riser cross-over conduit (46) extends from, and forms a part of, an upper portion or end of the separating chamber (50), in a substantially horizontal manner.

In this manner, the mixture of cracked hydrocarbon vapor product and spent catalyst travel through the riser cross-over conduit (46) at or near the upper end of the external riser reactor pipe (41) into the separating chamber (50) via the riser cross-over conduit (46), where the mixture encounters an internal partitioning baffle (47) located above the inlet opening (48) and direction change means (48*a*) of the stripping chamber (49), which divides the riser flow into two streams. A baffle (47*a*) located on the side opposite where the cracked hydrocarbon vapor product (including solid particles) enters, and is located between the separating chamber (50) and the stripping chamber (49) and above the inlet opening (48) and direction change means (48*a*) of the stripping chamber (49), prevents the two catalyst laden vapor streams from colliding, thus, preventing a catalyst cloud from forming, which would reduce the catalyst collection efficiency. In the separating chamber (50) (generally in the upper portion thereof), the hydrocarbon (and/or other) gases that are present in the cracked hydrocarbon vapor product are separated from the solid catalyst (or other) particles, preferably by a centrifugal and/or inertial effect that is exerted on the solid particles when the gaseous mixture is rotated or otherwise turned in a substantially vertical plane in the separating chamber (50) (in one or more different directions). The separating chamber (50) optionally includes a means to prevent recirculation of the gaseous mixture, such as a deflector (not shown).

Due to the centrifugal forces that are exerted on the cracked hydrocarbon vapor product in the separating chamber (50), the majority of the solid particles (spent catalyst and/or other solid particles) separate from the gases, and such separated solid particles slide in a downwards direction down through the separating chamber (50) towards the lower portion of the separating chamber (50), which includes at least one dipleg (37). According to one embodiment of the invention, the amount of solid particles generally ranges from about 70 percent to about 95 percent of the total solid particles that are present in the cracked hydrocarbon product that exits the external riser reactor pipe (41), and in another embodiment ranges from about 80 percent to about 90 percent. The diplegs (37) permit solid particles that have been separated from the gases, which may entrain a small amount of gas between its grains, and gas and liquid adsorbed in its pores, to exit the separating chamber (50), and enter into adjacent stripping bed located in the lower portion of the reactor vessel (51). The diplegs (37) may have a circular, rectangular or other cross-section, and generally have an open bottom, preferably with no design that restricts solid flow exiting the diplegs (37). The diplegs (37) may also be sealed with a bathtub sealing means, which is fluidized or provided with capability to pre-strip the separated catalyst with steam. A complete description of a bathtub sealing means useful in the practice of the present invention is disclosed in U.S. Pat. No. 6,692,552, the contents of which are incorporated herein by reference. Other dipleg seals known to those skilled in the art also may be employed in the practice of the present invention where desired (see, e.g., U.S. Pat. No. 5,110,323).

The operation of a stripping bed in a reactor vessel of an FCC unit is known to those skilled in the art. Typically, the bed will be equipped with baffles, packing or other devices for providing intimate contacting of the stripping gas and catalyst. Stripping gas, usually steam, is generally added in one or more places in the lower portion of the bed, such as through a steam ring. The stripping gas acts to displace remaining volatile hydrocarbons from the spent catalyst, so that these strippable hydrocarbons can be recovered and not burned in the regenerator. Stripped catalyst is then removed from the reactor vessel (51) via a standpipe for transport to a regenerator, as also is known to those skilled in the art.

As the centrifugal force in the separating chamber (50) forces the solids to the boundaries of the separating chamber (50), the cracked product gases generally peel off from the solids, assisted by baffle (47), exiting the separating chamber (50) into the stripping chamber (49) through at least one window or inlet opening (48). Additionally, the stripping chamber (49) has at least one flow direction change means (48*a*) which is defined in part by one outer wall of the stripping chamber (49) and is located above the inlet opening (48). The flow direction change means (48*a*) assists in keeping catalyst from entering through window (48).

As the primary purpose of separating chamber (50) is to make a rough cut (but still relatively complete) separation of the solid catalyst (or other) particles from the cracked product vapors in order to prevent over cracking, the separating chamber (50) is designed to make a rapid separation of a majority of the solid catalyst (or other) particles from the cracked product vapors. The cracked product vapors leaving the separating chamber (50), however, are typically entrained with a minor portion of particles and/or fines, which typically require additional separation, for example, in a gas-solid secondary separator, such as a cyclone.

Cracked product vapors that have been separated from a majority of the solid particles in the separating chamber (50), but have some entrained solids, exit the separating chamber (50) via inlet opening (48) are joined with stripping vapors from the stripping bed entering the stripping chamber (49) through stripper vapor inlet opening (45). The cracked product vapors and stripping vapors (also with some entrained catalyst particulates) are further separated from the entrained catalyst particles in a close-coupled cyclone system via one or more gas-solid secondary separators (43), such as cyclones, where the separation of the gases and remaining solid particles is generally After passing through the stripping chamber (49), the resulting stripping effluent, comprising stripping gas, cracked hydrocarbon gases, desorbed hydrocarbon gases from separated solid particles, and a minor portion of entrained catalyst, exits the stripping chamber through a stripper conduit and into secondary separators (43) (typically cyclones as are well known to those skilled in the art). In the secondary separators, the separation of entrained catalyst particulates from the vapors is essentially completed and the vapors exit the cyclones (43) through evacuation conduits (42). Evacuation conduits (42) in turn direct the vapors to a gas outlet collector (40) from which the vapors are removed from the reactor vessel (51) through vapor outlet conduit (44). The vapors are then directed to downstream processing units as are well known to those skilled in the art.

In the secondary cyclone separators (43), the remaining solid particles are separated from the vapors, and are removed via a dipleg (52) into the catalyst stripping bed.

Figures 3, 3A, 3B, 3C, 3D:
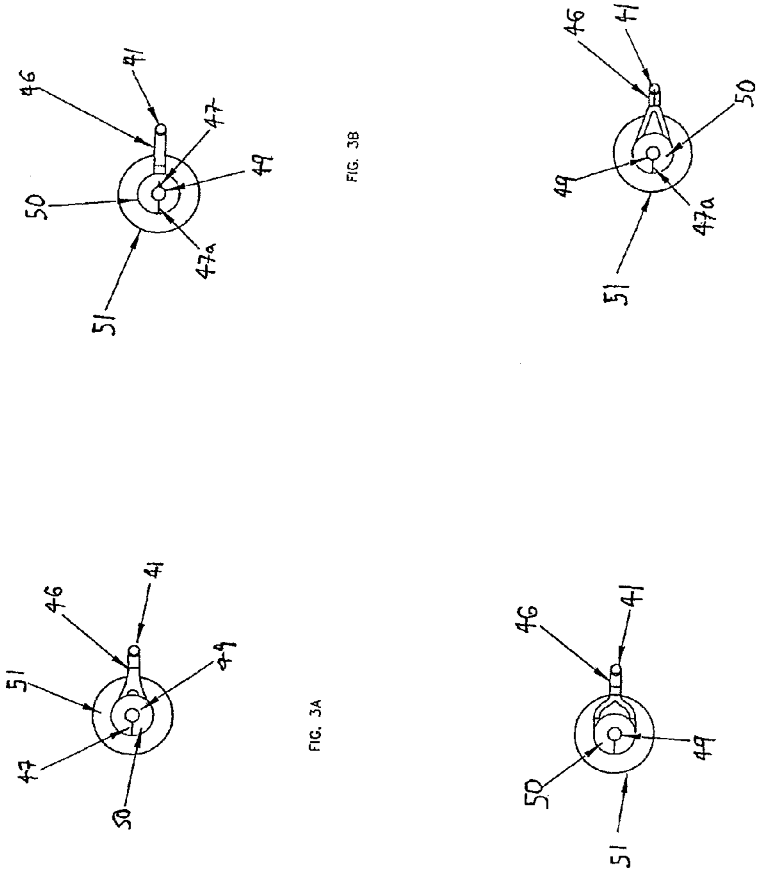
FIGS. 3A-3D illustrates the cross sections of various inlet configurations that may be employed in the apparatuses of the invention.

FIGS. 3A-3D illustrate the cross sections of several multiple inlet configurations (i.e., FIGS. 3A, 3C and 3D) that may be employed in the apparatus (10) of the invention. FIG. 3B presents one specific embodiment of the invention, which illustrates a cross section top view of an undivided riser cross-over conduit (46) inlet configuration, reactor shell (51), separating chamber (50), stripping chamber (49), partitioning baffle (47), and baffle (47*a*), wherein cracked hydrocarbon gas-solid mixture enters into the separating chamber (50) directly from riser cross-over conduit (46) for impingement on the partition baffle (47) which in turn divides the hydrocarbon gas-solid mixture into two vapor streams that are prevented from colliding with each other and forming a catalyst cloud by baffle (47*a*). FIG. 3A presents one specific embodiment of the invention, which illustrates a cross section top view of a divided "Y" shaped riser cross-over conduit (46) inlet configuration, reactor shell (51), separating chamber (50), stripping chamber (49), and baffle (47*a*), wherein cracked hydrocarbon gas-solid mixture enters into the separating chamber (50) from two inlets having first impinged upon the portion of the "Y" shaped inlet that divides the mixture into two vapor streams prior to entering the separating chamber (50). The vapor streams are prevented from colliding with each other and forming a catalyst cloud by baffle (47*a*). FIG. 3C presents one specific embodiment of the invention, which illustrates a cross section top view of a "horse-shoe" shaped divided riser cross-over conduit (46) inlet configuration, reactor shell (51), separating chamber (50), stripping chamber (49), and baffle (47*a*), wherein cracked hydrocarbon gas-solid mixture enters into the separating chamber (50) from two inlets having first impinged upon the dividing portion of the horse-shoe shaped inlet that divides the mixture into two vapor streams prior to entering the separating chamber (50). The vapor streams are prevented from colliding with each other and forming a catalyst cloud by baffle (47*a*). FIG. 3D presents one specific embodiment of the invention, which illustrates a cross section top view of a "V" shaped divided riser cross-over conduit (46) inlet configuration, reactor shell (51), separating chamber (50), stripping chamber (49), and baffle (47*a*), wherein cracked hydrocarbon gas-solid mixture enters into the separating chamber (50) from two inlets having first impinged upon the dividing portion of the "V" shaped inlet that divides the mixture into two vapor streams prior to entering the separating chamber (50). The vapor streams are prevented from colliding with each other and forming a catalyst cloud by baffle (47*a*).

Figure 4:
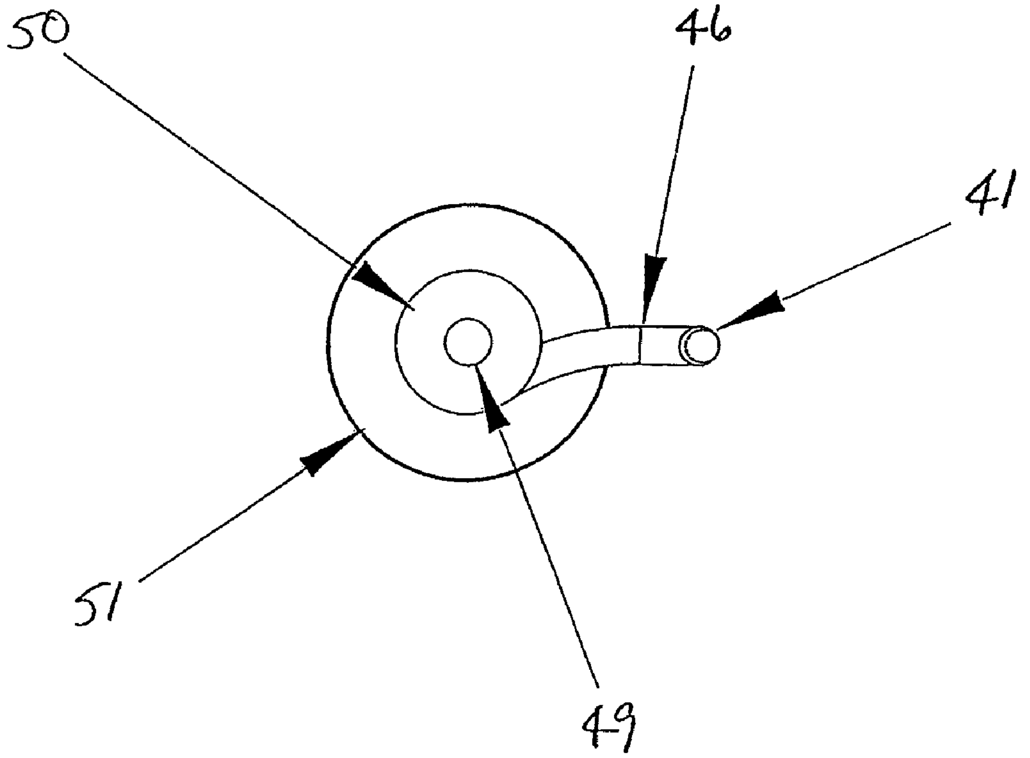
FIG. 4 illustrates the cross section of a single inlet configuration that may be employed in the apparatuses of the invention.

FIG. 4 presents one specific preferred embodiment of the invention, which illustrates a cross section top view of a single riser cross-over conduit (46) inlet configuration that may be employed in the apparatus (10) of the invention. The single riser cross-over conduit (46) inlet configuration provides enhanced rotational/centrifugal forces on the cracked hydrocarbon gas-solid mixture as it enters into the separating chamber (50). According to this embodiment no "baffle" effects are directly imposed on the mixture.

Although the present invention has been described in certain preferred embodiments, all variations obvious to one skilled in the art are intended to fall within the spirit and scope of the invention, including the appended claims. All of the above-referenced patents, patent applications and publications are hereby incorporated by reference in their entirety.

What is claimed is:

1. An apparatus for separating and stripping a gaseous mixture and a stream of particles which comprises:

a reactor vessel shell having a means for a riser cross-over conduit from a riser reactor pipe located external to said reactor vessel shell for transferring a mixture of cracked gases and spent catalytic solid particles, the reactor vessel shell comprising an upper dilute portion and a lower stripping bed portion, said riser cross-over conduit is in fluid communication with the riser reactor pipe and at least one separating chamber for receiving said mixture of cracked gases and spent catalytic solid particles from said cross-over conduit for separating spent catalytic particulates from the cracked gases located within said reactor vessel shell and comprising a dipleg for discharging separated catalytic particulates into said lower stripping bed portion;

a stripping chamber comprising at least one inlet opening communicating with said at least one separating chamber for receiving separated cracked gases from said separating chamber;

a stripper vapor inlet opening for receiving stripping gas from said stripping bed portion and a stripper conduit for evacuating vapors from said stripping chamber; and, at least one cyclone separator for receiving vapors from said stripping chamber and comprising at least one cyclone separator dipleg having an outlet for returning separated solids to the stripping bed and a vapor evacuation conduit for discharging vapors to a gas outlet collector which communicates with a vapor outlet conduit for removing separated vapors from said reactor vessel shell, wherein said stripping chamber is positioned centrally within said reactor shell and said at least one separating chamber is positioned axially about said stripping chamber and wherein said stripping chamber ascends centrally through said at least one separating chamber from a position below to a position above said at least one separating chamber.

2. The apparatus as defined in claim 1 wherein said at least one separating chamber further comprising a partition baffle located opposite the entrance of said riser crossover conduit for separating the mixture of cracked gases and spent catalyst into two streams traveling around the circumference of said separating chamber.

3. The apparatus as defined in claim 2 further comprising a baffle is positioned opposite said partition baffle and above said at least one inlet opening in said at least one separating chamber.

4. The apparatus as defined in claim 1 wherein said at least one inlet opening comprises at least one gas flow direction change means defined in part by one outer wall of the stripping chamber located above the at least one inlet opening, said gas flow direction change means receives separated cracked gases traveling vertically upward after separation from spent catalyst particles in the at least one separating chamber.

5. The apparatus as defined in claim 1, wherein said riser cross-over conduit is undivided and said at least one separating chamber contains a partition baffle and baffle.

6. The apparatus as defined in claim 1, wherein said riser cross-over conduit is divided and said at least one separating chamber contains a baffle.

7. The apparatus as defined in claim 1, wherein said riser cross-over conduit is undivided and said at least one separating chamber contains at least one baffle.

8. The apparatus of claim 1, further comprising a quench injection means to assist in terminating and/or reducing thermal cracking reactions.

9. A process for separating and stripping a gaseous mixture and a stream of particles in the apparatus of claim 1, said process comprising:

i) cracking a hydrocarbonaceous feedstock in the presence of a cracking catalyst in the riser reactor pipe located external to the reactor vessel shell having the means for receiving a stream of cracked product and spent catalyst via the riser cross-over conduit;

ii) separating a major portion of spent catalyst from said cracked product in the at least one separating chamber to form a stream of spent catalyst and a stream of cracked product entrained with spent catalyst particulates;

iii) receiving stripping vapor and cracked product vapor from said at least one separating chamber in the stripping chamber comprising the at least one inlet opening communicating with said at least one separating chamber located centrally within the reactor vessel shell and transporting the cracked product vapor to the at least one cyclone separator for receiving vapors from said stripping chamber and comprising the at least one cyclone separator dipleg having the outlet for returning separated solids to the lower stripping bed portion;

iv) stripping volatile hydrocarbons from the spent catalyst from step (ii) in the lower stripping bed portion;

v) separating the volatile hydrocarbons and stripping media from the stripped spent catalyst in the lower stripping bed portion;

vi) further separating the entrained spent catalyst particulates from said cracked product in said at least one cyclone separator; and vii) withdrawing the cracked product via the vapor evacuation conduit in communication with the at least one cyclone separator for discharging vapors to the gas outlet collector which communicates with the vapor outlet conduit for removing separated vapors from said reactor vessel shell.

10. The process as defined in claim 9, wherein said stripping media is at least one selected from the group consisting of steam, nitrogen, and ammonia.

* * * * *